(12) United States Patent
Rash et al.

(10) Patent No.: US 6,896,377 B2
(45) Date of Patent: May 24, 2005

(54) INTERCHANGEABLE LOW-BACKSCATTER APERTURE STRUCTURE

(75) Inventors: Clarence E. Rash, Enterprise, AL (US); John C. Mora, Fort Rucker, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/844,308

(22) Filed: May 12, 2004

(65) Prior Publication Data

US 2004/0207934 A1 Oct. 21, 2004

Related U.S. Application Data

(63) Continuation of application No. 10/006,316, filed on Dec. 4, 2001, now Pat. No. 6,834,971.

(51) Int. Cl.[7] .............................................. G02B 27/00
(52) U.S. Cl. ..................... 359/613; 359/227; 359/529; 359/894
(58) Field of Search .................. 359/227, 232, 359/529, 515, 534, 591, 597, 601, 602, 613, 614, 738–740, 642–645

(56) References Cited

U.S. PATENT DOCUMENTS

| 5,016,995 A | 5/1991 | Pullen, V |
| 5,161,238 A | 11/1992 | Mehmke |
| 5,243,464 A | 9/1993 | Lauf |
| 5,357,101 A | 10/1994 | Plesko |
| 5,550,367 A | 8/1996 | Plesko |
| 5,971,551 A | 10/1999 | Winston et al. |
| 6,327,090 B1 * | 12/2001 | Rando et al. ............... 359/618 |
| 6,516,116 B1 | 2/2003 | Murray et al. |
| 6,542,304 B2 * | 4/2003 | Tacklind et al. ............ 359/618 |
| 2001/0030742 A1 | 10/2001 | Kramer et al. |

FOREIGN PATENT DOCUMENTS

| EP | 0994369 A2 | 4/2000 |
| WO | WO 01/13158 A1 | 2/2001 |

OTHER PUBLICATIONS

Ryder, A., "Light Measurement Handbook" International Light 1998, pp. 1–64.

* cited by examiner

Primary Examiner—Scott J. Sugarman
Assistant Examiner—Darryl J. Collins
(74) Attorney, Agent, or Firm—Elizabeth Arwine

(57) ABSTRACT

An interchangeable low-backscatter aperture structure includes but is not limited to an aperture insert that is releasably engaged in a base. The aperture insert includes an aperture that may be of any shape. For example, the aperture may comprise a slit or it may be circular. The aperture insert may be held in the base by any securing mechanism capable of releasably securing the insert to the base. In one embodiment the securing mechanism includes a plurality of pressure clips.

9 Claims, 5 Drawing Sheets

Ideal Case

Actual Case

The law of reflection, depicting the incedent and reflected rays.

Specular Reflection

Diffuse Reflection

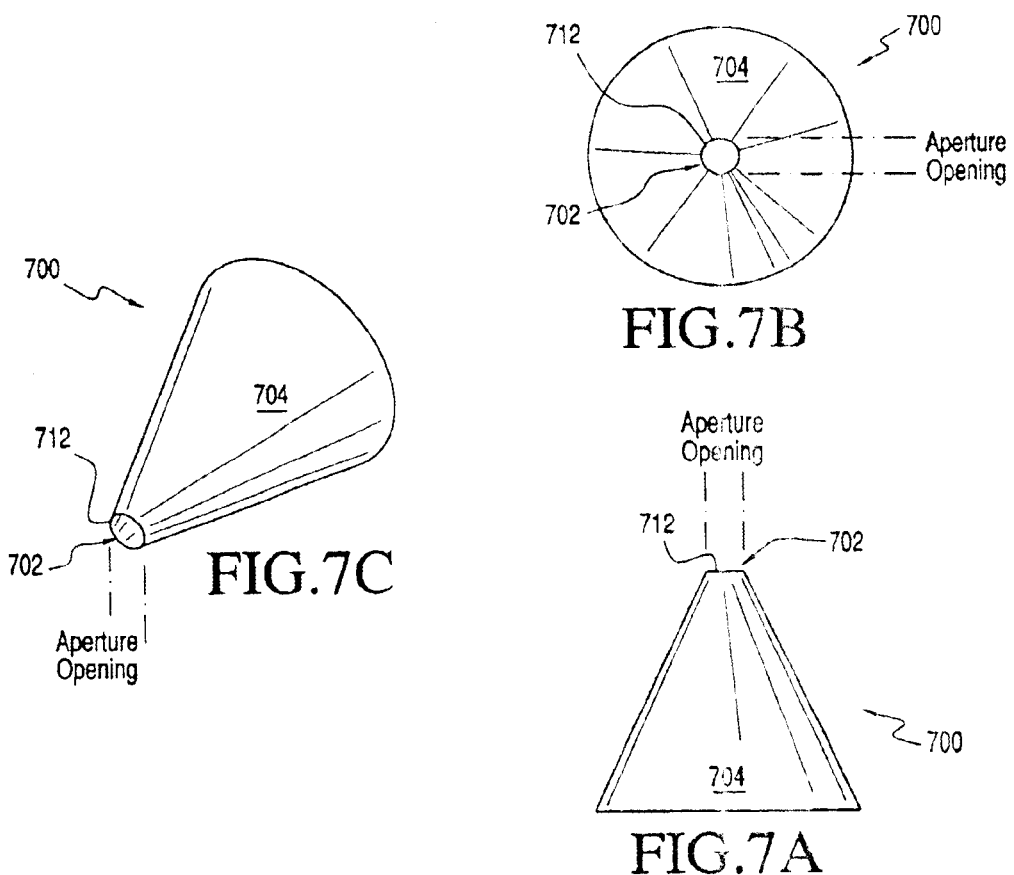
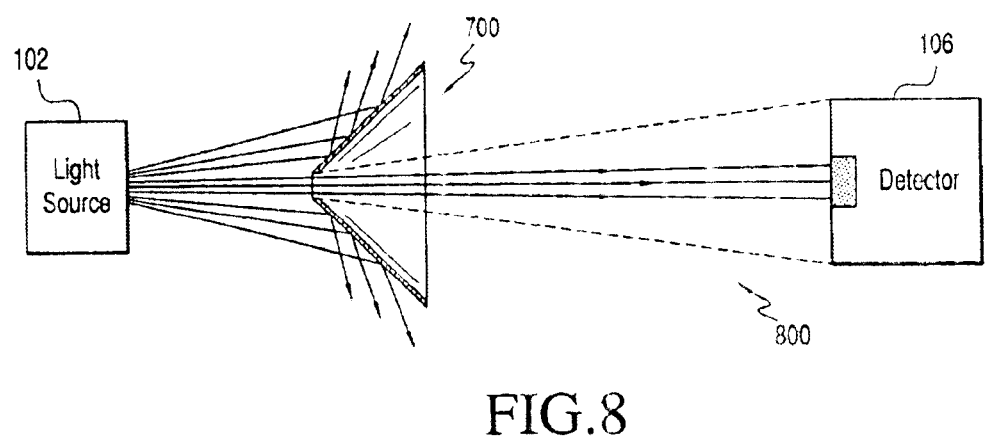

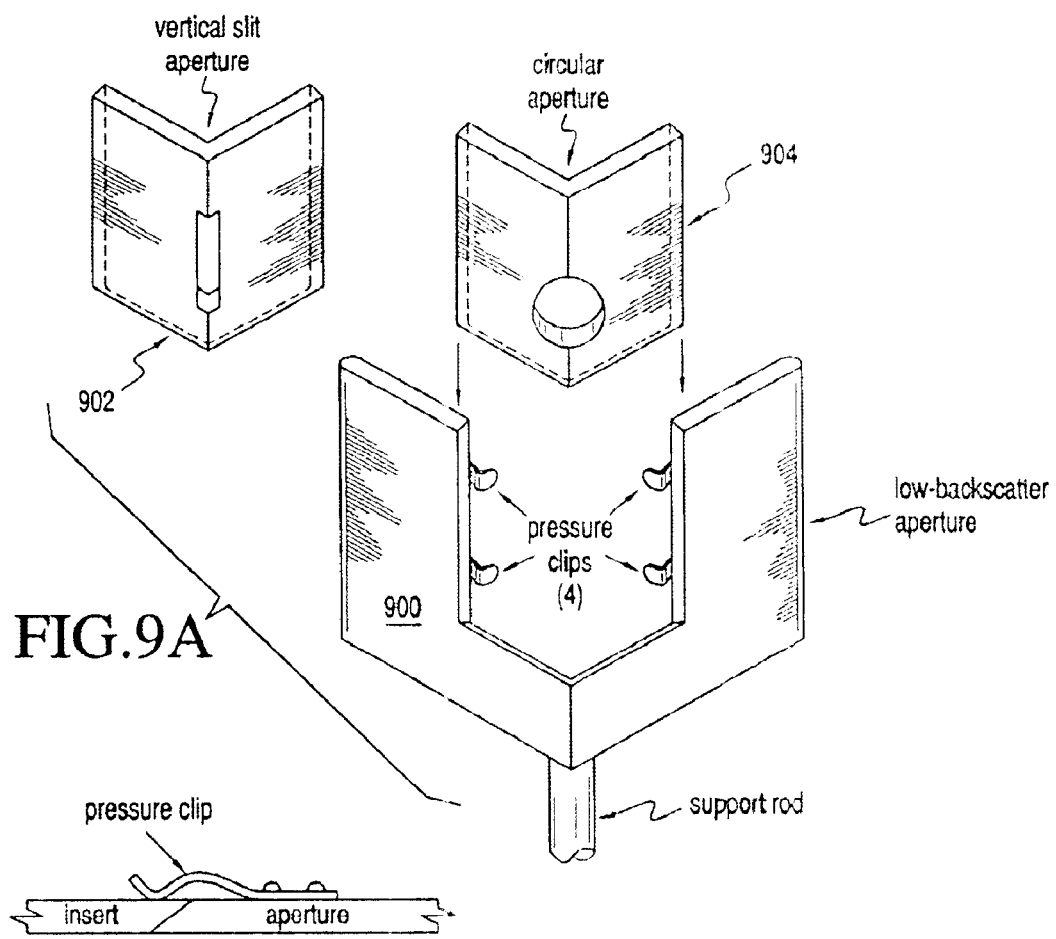
FIG.9A
FIG.9B
FIG.10
Comparison of lamp readings as a function of aperture distance for conventional and low-backscatter designs.
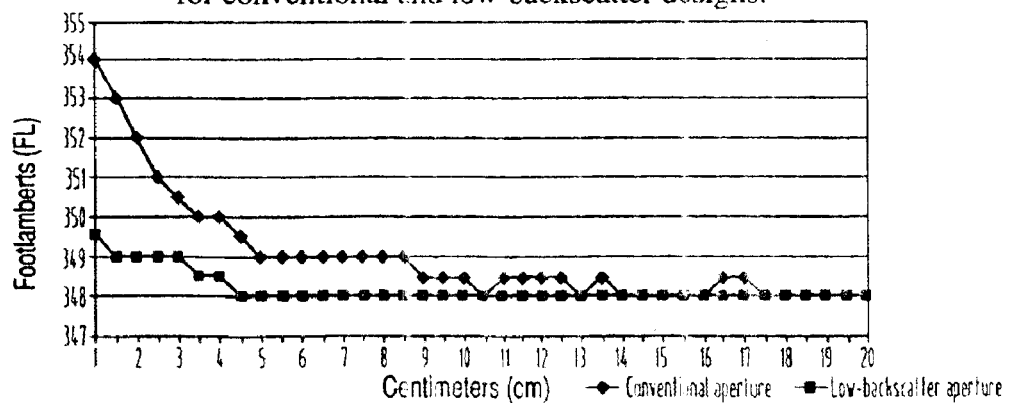

INTERCHANGEABLE LOW-BACKSCATTER APERTURE STRUCTURE

This application is a continuation of application Ser. No. 10/006,316 filed Dec. 4, 2001 now U.S. Pat. No. 6,834,971.

I. STATEMENT REGARDING FEDERALLY SPONSORED RESEARCH OR DEVELOPMENT

This invention was made with government support by the United States Army. The government has certain rights in this invention.

II. BACKGROUND OF THE INVENTION

1. Field of the Invention

The present application relates, in general, to apertures for the control and/or measurement of light.

2. Description of the Related Art

An aperture is an opening through which light energy can pass. An aperture can be thought of as an opening at a selected point in an optical system that determines the size of the bundle of light rays that traverse the system. Virtually all optical systems incorporate one or more apertures. For example, apertures may be used, in various optical systems, to define a field-of-view (e.g., as used in telescopes, microscopes and other imaging optics), define beam convergence/divergence and uniformity (e.g., as used in collimating optics), or control the size of an image (e.g., as used in some reflectance, transmittance, or detector response accessories).

Within optical systems, apertures often appear in what are known in the art as optical "trains". An optical train is typically used to control and/or measure light, and optical systems typically have at least one, and sometimes several, optical trains. For sake of illustration, an optical train can be treated as having three main components: a light source, a controlling device (e.g., an aperture), and a detector. These components generally are arranged in a serial manner.

With reference now to the figures, and in particular with reference now to FIG. 1A, shown in side plan view is an optical train 100 consisting of a light source (e.g., a lamp) 102, an aperture (e.g., a cylinder drilled in a piece of sheet metal) 104, and a detector (e.g. a photometer) 106. Although the aperture 104, when shown in perspective view (see FIG. 1B), appears circular in shape, those having ordinary skill in the art will appreciate that apertures can be quite varied in shape (e.g., circular, square, slit(s), star, or other various shapes).

FIG. 1A represents the "ideal" case, in which it is assumed that the surface 108 facing the light source 102 is totally absorbing of light, and hence that the "signal strength," or intensity, of the light detected by the detector 106 is solely indicative of the signal strength of the light source 102. When optical systems are designed analytically, it is most common for the system designers to perform the analytic calculations assuming the idealized case in their calculations. Unfortunately, actual systems rarely tend to approach the idealized case.

Referring now to FIG. 2, illustrated is an optical train representative of an actual, as opposed to idealized, related-art system. As shown, in an attempt to approach the idealized case, the surface 108 facing the light source 102 is treated or prepared to be "light absorbing" (e.g., is painted black). However, also as shown, in the related art such preparations often fall short, and instead what happens is that a measurably significant amount of light 200 is reflected back from the surface 108. Depicted is that a portion of this reflected light is subsequently re-reflected such that it makes its way through the 104 aperture and is thereafter detected by the detector 106.

Those having ordinary skill in the art will recognize that the re-reflected light energy will often tend to give an indication that the light source 102 is more powerful than the light source 102 actually is (indicated in FIG. 2 by making the triangles representing light energy larger than they appear in FIG. 1A). Accordingly, such re-reflected light, when considered from the standpoint of measuring the intensity or signal strength of the light source 102, is essentially "noise." Those having ordinary skill in the art will also recognize that such noise often clashes with analytical designs and calculations which assumed no, or measurably insignificant, noise. This resulting clash, at best, requires considerable subsequent work to make analytically designed systems function as desired, and, at worst, requires that the analytically designed systems be redesigned with assumptions more close to an actual system such as that depicted in FIG. 2.

Consequently, it is apparent that a need exists in the art for a method and system which substantially decreases noise due to reflections from one or more surfaces below the level of that manifested in comparably sized and situated related-art systems.

III. BRIEF SUMMARY OF THE INVENTION

The inventors named herein ("inventors") have devised a method and system which substantially decrease optical noise below that manifested in related-art systems.

In one implementation, an interchangeable low-backscatter aperture structure includes but is not limited to an aperture insert having a first wall element and a second wall element disposed at an acute angle to the first wall element and an aperture bisecting the first and second wall elements. The aperture structure further includes a base having a first wall element and a second wall element disposed at an acute angle to the first wall element, where each of the first and second wall elements includes a cutout portion. The cutout portion is preferably configured to receive the aperture insert. The aperture structure also includes a securing mechanism attached to at least one of the wall elements of the base and is preferably configured to releasably engage the aperture insert.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

IV. BRIEF DESCRIPTION OF THE SEVERAL VIEWS OF THE DRAWING(S)

Figure 5A:
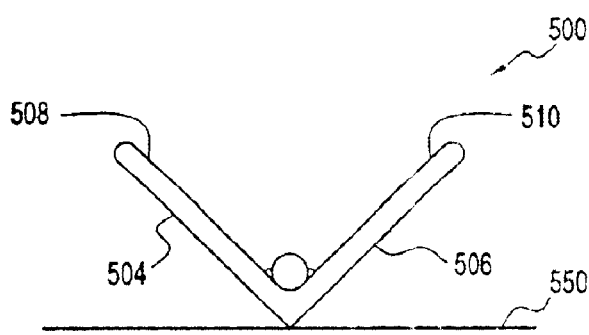
Figure 5B:
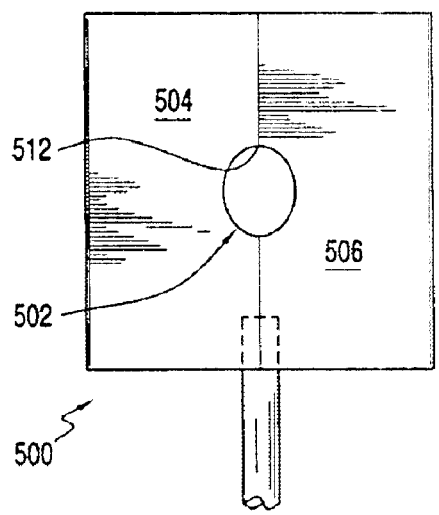
Figure 5C:
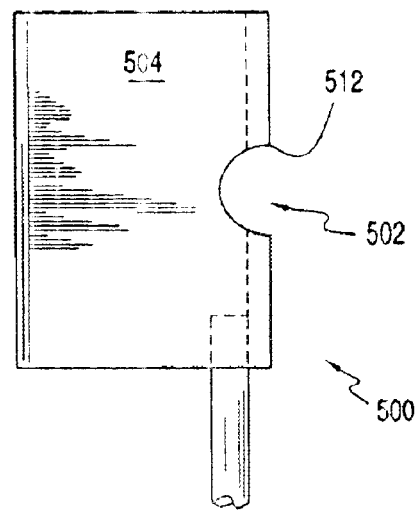

FIGS. 5A, 5B, and 5C respectively depict in top plan, front plan, and side plan view a low-backscatter aperture structure 500 having a circular aperture 502, where the circular aperture 502 has an ingress 512 and an egress.

Figure 6:
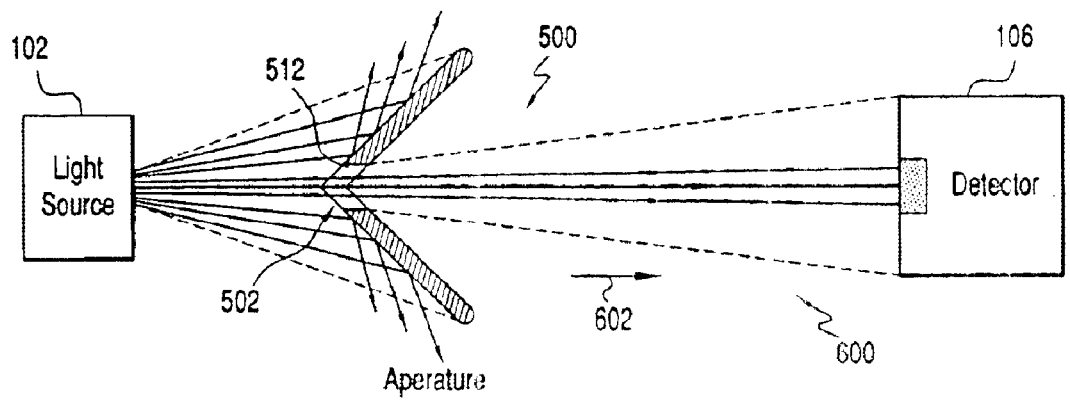

FIG. 6 illustrates optical train 600, which is similar to optical train 100, only modified to include an implementation of the low-backscatter aperture structure 500.

FIGS. 7A, 7B, and 7C, respectively show in top, front, and perspective view a low-backscatter aperture structure 700 formed to be symmetrical, and having a circular aperture 702, where the circular aperture has an ingress 512 and an egress.

FIG. 8 shows an optical train 800 substantially analogous to that shown in FIG. 6, except that the V-shaped low-backscatter aperture structure 600 of FIG. 6 has been replaced with the truncated-cone-shaped low-backscatter aperture 700 of FIG. 7.

FIGS. 9A and 9B, respectively, show removable aperture openings in accordance with the invention.

FIG. 10 illustrates a graph of lamp readings as a function of aperture distance.

The use of the same symbols in different drawings typically indicates similar or identical items.

V. DETAILED DESCRIPTION OF THE INVENTION

As described above, the behaviors of related-art systems which use apertures often vary substantially from the analytic, or "ideal," systems which have assumed "ideal" apertures for sake of simplicity in calculation and design. Also as described above, the inventors have surmised that one reason why actual systems might tend to vary substantially from ideal systems is that backscatter of light from the aperture-defining structures might be creating measurably significant noise. To further understand their beliefs with respect to the above-identified problems, the inventors briefly examine how light can be conceptualized when simple ray tracing diagrams are used.

Figure 1A:
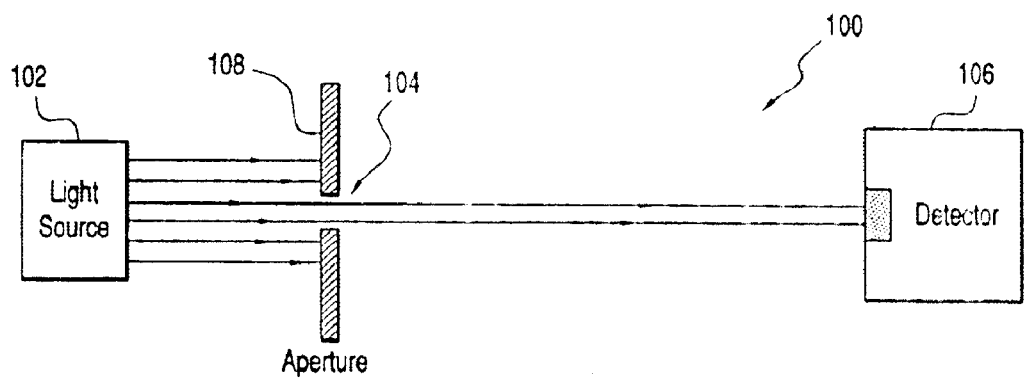
FIG. 1A shows a side plan view of an optical train 100 including a light source (e.g., a lamp) 102, an aperture (e.g., a cylinder drilled in a piece of sheet metal) 104, and a detector (e.g. a photometer) 106.
Figure 1B:
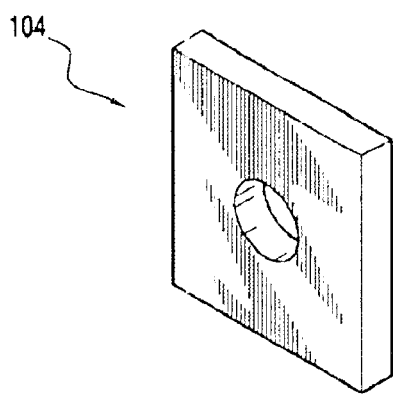
FIG. 1B, depicts the aperture 104 of FIG. 1A in perspective view.
Figure 2:
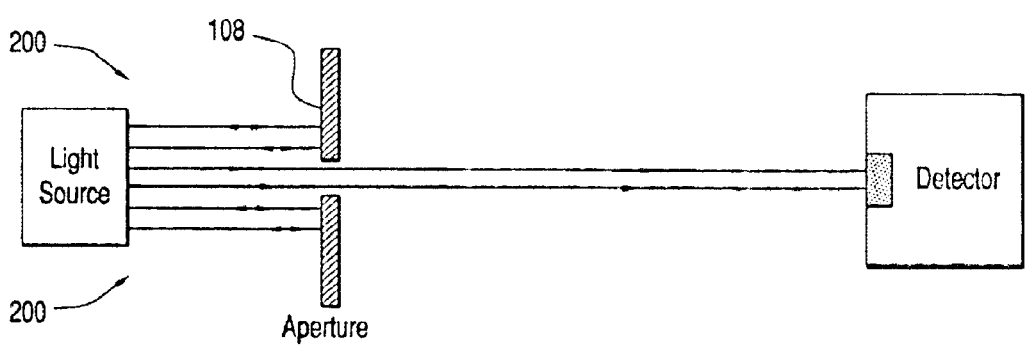
FIG. 2, illustrates an optical train representative of an actual, as opposed to idealized, related-art system
Figure 3:
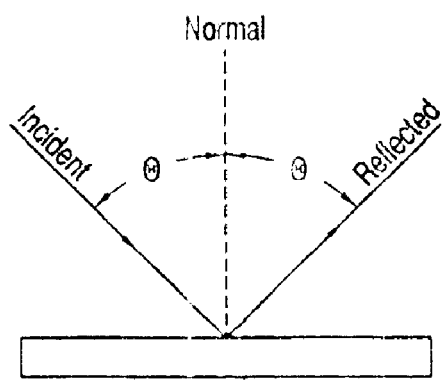
FIG. 3 shows graphically the "law" of reflection.

The inventors have surmised that backscatter can be thought of as primarily a result of light rays obeying the "law of reflection." This law says that when a light ray is incident on a plane surface at an angle, θ, to a normal to the surface, the reflected ray also will be at that angle and in the same plane defined by the incident ray and the normal. In other words, the angle of reflection equals the angle of incidence. This law is graphically illustrated in FIG. 3.

Figure 4A:
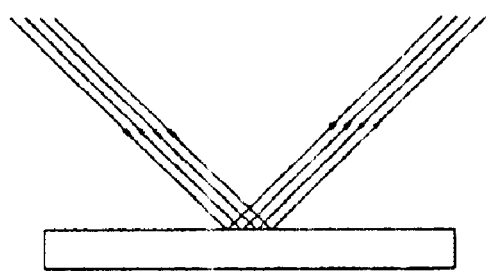
FIG. 4A depicts what is known in the art as specular reflection.

One might think that, if instead of one ray, there were multiple parallel rays striking a flat surface, the application of the law of reflection would result in the situation depicted in the FIG. 4A (and in fact this is often the assumption made in many related-art optical texts and systems). However, the inventors have noticed that this type of reflection, which is typically referred as specular reflection within the art, generally only results when the surface is so smooth that its irregularities are small, relative to the wavelength of the incident light. The inventors have also noticed that many surfaces are not microscopically smooth and hence result in the rays in a parallel beam of light being reflected in all directions; this type of reflection, often called, diffuse reflection is illustrated in FIG. 4B.

Figure 4B:
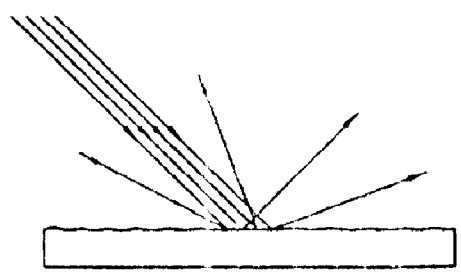
FIG. 4B illustrates what is known in the art as diffuse reflection.

The inventors have surmised that when reflections such as those shown in FIGS. 4A and 4B result in backscatter within an optical system, measurement errors and noise become undesirable consequences. (However, should the foregoing belief turn out not to be true, it should be noted that the subject matter herein-described still has utility, in that it has been experimentally verified to work, and hence the utility of the subject matter herein described is separate and apart from an explanation of "why" the subject matter herein described "works," or prove useful.) Accordingly, the following describes processes and devices to reduce backscatter in the direction(s) of an optical channel (e.g., the optical train 100). As will be seen, the subject matter described herein significantly reduces the need for an aperture "standoff" requirement (e.g., a requirement that the aperture 104 be a defined distance away the light source 102 so as to keep optical noise to acceptable levels), thereby providing at least the benefit of allowing optical systems to become more compact without the costs in error and noise that would be manifest in related-art systems.

In the preceding discussion of related-art aperture structures, it was surmised that the law of reflection contributes to the error and noise in optical systems. In contradistinction to the related-art, the following-described aperture structures are surmised to actually use the law of reflection to reduce the rays reflected along the optical train, thereby reducing the error and noise.

Referring now to FIGS. 5A, 5B, and 5C, respectively depicted in top plan, front plan, and side plan view is a low-backscatter aperture structure 500 having a circular aperture 502, where the circular aperture 502 has an ingress 512 and an egress (not shown). Illustrated are first and second aperture-ingress-side surfaces 504, 506, and first and second aperture-egress-side surfaces 508, 510, where the terms "ingress" and "egress" refer to the way light is preferably expected to transit the circular aperture 502. Shown is that the first and second aperture-ingress-side surfaces 504, 506 are positioned such that light originating external to at least one of the aperture-ingress-side surfaces 504, 506 is either allowed to enter the aperture ingress 512 or is substantially reflected in a direction such that re-reflection though the aperture ingress 512 is substantially minimized. Depicted is that in one embodiment this is achieved via a 45-degree angle; however, those having ordinary skill in the art will recognize that the 45-degree angle is merely an example angle, and that many other angles can be utilized such that light originating external to at least one of the aperture-ingress-side surfaces 504, 506 is either allowed to enter the aperture ingress 512 or is substantially reflected in a direction such that re-reflection through the aperture ingress 512 is substantially minimized. For example, having at least one of the aperture-ingress-side surfaces 504, 506 placed at an acute angle relative to a plane 550 defined by an ingress 512 of the aperture 502.

Continuing to refer to FIGS. 5B and 5C, depicted is that in one implementation the low-backscatter aperture structure 500 is fabricated to accept a support rod 502, thereby providing a rod-mount feature sufficient to allow the low-backscatter aperture 500 to be used in optical bench setups, e.g., for test and evaluation, source measurement, etc. It has been experimentally validated that the low-backscatter aperture structure 500 produces a substantial reduction of optical noise below that observed in related-art apertures (such reduction surmised to be due to reduced backscatter). It is surmised that the V-shape of the low-backscatter aperture design changes the angle of incidence of a measurably significant portion of rays that do not pass through the aperture ingress 512. Consequently, it is further surmised that the rays are reflected at angles that direct such reflected rays away from the path of an optical system in which an implementation of the low-backscatter aperture structure 500 is utilized.

With reference now to FIG. 6 illustrated is optical train 600, which is similar to optical train 100, only modified to include an implementation of the low-backscatter aperture structure 500. Shown is a surmised mechanism whereby light from the light source 102 is reflected in a direction such that re-reflection through the aperture ingress 512 is substantially minimized (e.g., such that the likely reflection of light is in a direction which would make it unlikely that light would be re-reflected through the ingress 512 of the aperture 502). For example, the reflected ray would have direction either transverse to the directional arrow 602, or have a direction whose horizontal directional component is parallel to and in the same direction as directional arrow 602. Directional arrow 602 is intended to be representative of a line which a light ray would follow if it were to travel from ingress to egress, and directly along the axis, of aperture 502.

The foregoing pictographic illustrations of the low-backscatter aperture structure 500 depict the low-backscatter aperture structure 500 as having substantially flat aperture-ingress-side surfaces 504, 506. Those having ordinary skill in the art will recognize that such surfaces need not necessarily be flat, and that many different shaped surfaces can be utilized to like effect (e.g. curved surfaces can be utilized, provided such surfaces are oriented such that light originating external to the aperture-ingress-side surfaces is reflected in a direction such that re-reflection through the aperture ingress 512 is substantially minimized; that is, such that the likely reflection of light is in a direction which would make it unlikely that light would be re-reflected through the ingress 512 of the aperture 502 (e.g., the reflected ray would have direction either transverse to the directional arrow 602, or have a direction whose horizontal directional component is parallel with and in the same direction as directional arrow 602). Directional arrow 602 is intended to be representative of a line which a light ray would follow if it were to travel from ingress to egress, and directly along the axis, of aperture 502.

With respect to the aperture-ingress-side surfaces 504, 506 themselves, in some implementations at least one of the aperture-ingress-side surfaces 504, 506 is treated to substantially reflect light (e.g., is given a "mirror-like" surface, such that the likelihood of specular reflection is likely), while in other implementations at least one of the aperture-ingress-side surfaces 504, 506 is treated to substantially absorb light (e.g., is treated with black paint). In addition to the foregoing, in yet other embodiments, when a low-backscatter aperture structure 500 is to be used in an enclosed system (e.g., in a telescope), the enclosure housing the low-backscatter structure 500 is appropriately coated to enhance absorption and decrease reflections.

Referring now again to FIGS. 5 and 6, those skilled in the art will recognize that yet another way in which low-backscatter aperture 500 can be described is such that the one or more flat or curved surfaces are placed at an orientation whereby light rays surmised to be obeying the law of reflection would be reflected along a path such that, absent re-reflection, the light rays would not cross plane 550 defined by the ingress 512 of the aperture 502.

Those having ordinary skill in the art will recognize that the low-backscatter aperture structure 500 pictographically represented in FIGS. 5 and 6 is geometrically constrained (i.e., asymmetrical). In another implementation, the low-backscatter structure has a substantially symmetrical structure.

Referring now to FIGS. 7A, 7B, and 7C, respectively shown in top, front, and perspective view is a low-backscatter aperture structure 700 formed to be symmetrical, and having a circular aperture 702, where the circular aperture has an ingress 712 and an egress (not shown). In contrast to the low-backscatter aperture structure 500 shown in FIGS. 5 and 6, in the implementation shown in FIGS. 7A, 7B, and 7C, the low-backscatter aperture structure 700 is symmetrical. Illustrated is a first aperture-ingress-side surface 704, where the term "ingress" refers to the way light is preferably expected to transit the circular aperture 702. Shown is that the first aperture-ingress-side surface 704 is formed such that light originating external to the first aperture-ingress-side surface 704 is either allowed to enter the aperture ingress 712 or is substantially reflected in a direction such that re-reflection though the aperture ingress 712 is substantially minimized. Those having ordinary skill in the art will appreciate that the sizes of low-backscatter apertures will vary depending upon application. Those skilled in the art will also recognize that the comment related to the treatment of the surface(s) (e.g., to absorb or reflect light) of the low-backscatter aperture structure 500 shown in FIG. 5 apply equally well to the low-backscatter aperture structure 700 shown in FIG. 7.

With reference now to FIG. 8, shown is an optical train 800 substantially analogous to that shown in FIG. 6, except that the V-shaped low-backscatter aperture structure 500 of FIG. 6 has been replaced with the truncated-cone-shaped low-backscatter aperture 700 of FIG. 7. Also shown is a surmised operation for the implementation shown, which is substantially similar to operation shown for the V-shaped implementation in FIG. 6, except that the rays are surmised to have been reflected in a 360-degree pattern due to the truncated-cone shape of the low-backscatter aperture structure 700.

Referring now again to FIGS. 7 and 8, with respect to the aperture-ingress-side surface 704 itself, in some implementations the aperture-ingress-side surface 704 is treated to substantially reflect light (e.g., is given a "mirror-like" surface, such that the likelihood of specular reflection is likely), while in other implementations the aperture-ingress-side surface 704 is treated to substantially absorb light (e.g., is treated with black paint). In addition to the foregoing, in yet other embodiments, when a low-backscatter aperture structure 700 is to be used in an enclosed system (e.g., in a microscope), the enclosure housing the low-backscatter structure 700 is appropriately coated to enhance absorption and decrease reflections.

The inventors have hypothesized that for miniature optical systems, fixed apertures (e.g., those having specific shaped and sized aperture openings), would be the standard implementation. However, the inventors have also surmised that optical bench applications using low-backscatter aperture structures could be made more cost effective if the low-backscatter aperture structures were fabricated in such as way as to provide replaceable openings.

Referring now to FIGS. 9A and 9B, shown is a low-backscatter aperture structure fabricated such that it provides replaceable openings. Depicted is universal base 900 fabricated to accept interchangeable low-backscatter aperture structures 902, 904. Interchangeable low-backscatter aperture structures 902, 904 are respectively illustrated in FIG. 9A, where interchangeable low-backscatter aperture structure 902 is shown with a circular opening and where interchangeable low-backscatter aperture structure 904 is shown with a slit opening. However, while only slit and circular openings are shown, openings of various sizes and shapes are contemplated. In addition, while any number of methods of interchangeability are possible, an implementation which uses pressure spring clips is depicted in FIG. 9A.

With reference now to FIG. 9B, shown is a top-plan cutaway view depicting how interchangeable low-backscatter aperture structures 902, 904 interface with universal base 900 and are held in place by pressure clips.

The inventors have experimentally verified that the V-shaped low-backscatter aperture structure 500 provides lower optical noise than that arising from related-art apertures. This verification was achieved via a Gamma Scientific RS-12 regulated tungsten reference lamp, a Photo Research 1980A photometer, a 3-meter optical bench rail, mounting hardware, a related-art flat aperture with a 1½-inch circular opening, and a custom-fabricated, V-shaped low-backscatter aperture structure 500, also with a 1½-inch circular opening.

During experimental verification the reference lamp, the aperture under test, and the photometer were mounted on the optical bench rail. The photometer was focused on the front surface of the lamp. The distance between the photometer and the lamp was fixed at 136 centimeters (cm). The initial reading of the lamp was taken in a dark room without an aperture present and measured to be 348.1 foot lamberts (FL). After the initial recording, the conventional flat aperture was placed in the optical train and initially placed 1 cm from the front of the lamp. A reading of the light source was made at this position and at subsequent positions in 0.5-cm increments out to a distance of 20 cm from the light source. The conventional flat aperture then was replaced with a V low-backscatter aperture, and lamps measurements were repeated at the same positions.

The data from these measurements are plotted in FIG. 10. Differences in the lamp readings can be noted for the two aperture designs for aperture positions out to approximately 9–10 cm. These differences also validate the low-backscatter concept design. While this rudimentary validation produced a relatively small, 1.27 percent, reduction in the lamp measurement error in this macro application, this error difference was as large as 4.5 FL.

Another observation is that the fabricated example of the low-backscatter aperture tested did not completely eliminate the backscatter. While this residual effect was expected (hence the "low-backscatter" nomenclature), those having ordinary skill in the art will appreciate that the residual effect could be reduced further with a better "black" absorbing matte coating on the aperture and a more finely honed ridge on the front of the "V" edge of the aperture.

While the foregoing discussion has described an optical train having an implementation of the low-backscatter aperture structure, those having ordinary skill in the art will recognize that the low-backscatter aperture structure can be employed in other systems such as cameras, telescopes, microscopes or other imaging systems, an optical communications systems, and test and measurement systems (e.g., light benches). In short, virtually any system which controls and channels light can employ the low-backscatter aperture structure described herein.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. An interchangeable low-backscatter aperture structure comprising:

an aperture insert including a first wall element and a second wall element disposed at an acute angle to the first wall element and including an aperture bisecting the first and second wall elements;

a base including first wall element and a second wall element disposed at an acute angle to the first wall element, each of the first and second wall elements including a cutout portion, the cutout portions being configured to receive said aperture insert; and a securing mechanism attached to at least one of the wall elements of said base, said securing mechanism being configured to releasably engage said aperture insert.

2. The aperture structure of claim 1, wherein the securing mechanism includes a plurality of pressure clips.

3. The aperture structure of claim 2, wherein the aperture is circular.

4. The aperture structure of claim 2, wherein the aperture is a slit.

5. The aperture structure of claim 2 further comprising a support rod attached to said base.

6. An interchangeable low-backscatter aperture structure comprising:
   an aperture insert including a first wall element and a second wall element disposed at an acute angle to the first wall element and including an aperture bisecting the first and second wall elements; and
   means for reflecting light incident from a light source away from the light source and for receiving and releasably engaging said aperture insert, said means for reflecting including a first wall element and a second wall element disposed at an acute angle to the first wall element, each of the first and second wall elements including a cutout portion having a securing mechanism, the cutout portions being configured to receive said aperture insert and the securing mechanism being configured to releasably engage said aperture insert.

7. The aperture structure of claim 6 wherein the aperture is circular.

8. The aperture structure of claim 6 wherein the aperture is a slit.

9. The aperture structure of claim 6 wherein the securing mechanism includes a plurality of pressure clips.

* * * * *